(12) United States Patent
Buchele

(10) Patent No.: US 6,822,507 B2
(45) Date of Patent: Nov. 23, 2004

(54) ADAPTIVE SPEECH FILTER

(76) Inventor: William N. Buchele, 19067 Reed Knoll Rd., Los Gatos, CA (US) 95030

(*) Notice: Subject to any disclaimer, the term of this patent is extended or adjusted under 35 U.S.C. 154(b) by 0 days.

(21) Appl. No.: 10/335,971

(22) Filed: Jan. 2, 2003

(65) Prior Publication Data
US 2003/0151454 A1 Aug. 14, 2003

Related U.S. Application Data

(63) Continuation of application No. 09/559,227, filed on Apr. 26, 2000, now abandoned.

(51) Int. Cl.[7] .............................................. H03K 5/00
(52) U.S. Cl. ...................................... 327/553; 327/552
(58) Field of Search ................................ 327/552, 553; 381/317; 330/305

(56) References Cited

U.S. PATENT DOCUMENTS 4,790,018 A * 12/1988 Preves et al. ............... 381/317
5,832,039 A * 11/1998 Rijns ........................... 375/317

* cited by examiner

Primary Examiner—Dinh T. Le
(74) Attorney, Agent, or Firm—Henneman & Saunders; Larry E. Henneman, Jr.

(57) ABSTRACT

An adaptive speech filter (10) for conditioning speech signals to increase signal to noise ratio in a relatively noisy environment. The adaptive speech filter (10) has a preamp circuit (12), a high pass adaptive filter circuit (14), an output buffer circuit (16), a peak detector amplifier/filter circuit (18), a peak detector circuit (20) and a voltage regulator circuit (22), embodied in an application specific integrated circuit (24). The adaptive speech filter (10) is intended for input to telephones, radios, and the like.

12 Claims, 7 Drawing Sheets

ADAPTIVE SPEECH FILTER

RELATED APPLICATIONS

This application is a continuation of U.S. patent application Ser. No. 09/559,227 filed on Apr. 26, 2000 now abandoned by the same inventor, and which is incorporated herein by reference in its entirety.

TECHNICAL FIELD

The present invention relates to the field of electronic circuitry, and more particularly to an improved signal processing circuit for optimizing speech recognition in potentially noisy ambient conditions. The predominant current usage of the present inventive adaptive speech filter is in the processing of signals from a microphone used for hands free telephonic communications, wherein it is desirable to produce a strong and clearly intelligible signal.

BACKGROUND ART

It is known in the art to amplify input audio signals, and to filter such inputs so as to accentuate the effective signal to noise ratio. It is also known in the art to combine such functions in an integrated circuit, or the like. An adaptive highpass filter manufacture by Gennum™ Corporation is a high pass filter which is intended to accentuate speech over background noise, and which is designed and intended primarily for use in hearing aid devices, and the like.

There exists today a need for communications input devices, such as voice input microphones and similar type devices, which can be adapted to the ever increasing range of interpersonal voice communications means. Such means include, but are not limited to, conventional telephone devices, cellular and other portable telephone devices, long and short range radio communications devices, and the like. Although there have been numerous circuit designs, such as the Gennum™ device discussed above, which are intended to reduce background noise under varying ambient conditions, none of the existing circuits has have been well adapted for use with such communications input devices. Among the desirable features for such an application which have not been adequately met in the prior art are a low operating current requirement, relative absence of a startup current surge, shared signal output and power input connections, adaptability to tailor input impedance and/or gain to a variety of microphone devices, and optimized filter response characteristics.

Clearly, it would be desirable to have a filter device with one or more of the above described desirable characteristics. However, to the inventor's knowledge, no device has existed in the prior art which combines these characteristics, or even a significant subset thereof.

DISCLOSURE OF INVENTION

Accordingly, it is an object of the present invention to provide an adaptive speech filter which requires very low current to operate.

It is still another object of the present invention to provide an adaptive speech filter which effectively reduces background noise relative to intelligible speech frequency signal.

It is yet another object of the present invention to provide an adaptive speech filter which does not require an initial high startup current.

It is still another object of the present invention to provide an adaptive speech filter which has common signal output and power input lines.

It is yet another object of the present invention to provide an adaptive speech filter circuit which can be readily tailored to the sensitivity and frequency response of an input microphone.

It is still another object of the present invention to provide an adaptive speech filter which has filter response and timing characteristics well adapted to the requirements of a voice communication apparatus It is yet another object of the present invention to provide an adaptive speech filter which will operate at a low voltage.

Briefly, a known embodiment of the present invention is an electrical circuit residing primarily on an application specific integrated circuit ("ASIC"). According to an embodiment of the inventive adaptive speech filter circuit, a preamp circuit, a highpass adaptive filter circuit, an output buffer circuit, a peak detector amplifier/filter circuit, a peak detector circuit and a voltage regulator circuit are provided. The preamp circuit provides frequency and gain compensation to match the inventive adaptive filter circuit for use with a variety of microphone input devices. The highpass adaptive filter circuit has a Chebyshev highpass filter for suppressing ambient low frequency noise, and the corner frequency varies according to the level of background noise. The output buffer circuit provides a low output impedance, high signal drive output. The peak detector amplifier/filter circuit is used to further condition the audio signal before it is sampled by the peak detector circuit. The peak detector circuit is a precision rectifier circuit used to detect the peak audio level, for modifying the corner filter frequency accordingly, and the voltage regulator circuit provides the reference and bias voltages to the other components of the adaptive filter circuit.

An advantage of the present invention is that background noise is effectively reduced while speech signal remains well intelligible.

A further advantage of the present invention is that little current is required to operate the device.

Yet another advantage of the present invention is that startup current is not significantly greater than normal operating current.

Still another advantage of the present invention is that the signal output and VCC power input are shared, thereby providing compatibility with convention telephonic communication lines.

Yet another advantage of the present invention is that the circuit can be readily configured for use with microphones having different sensitivities and frequency responses.

Still another advantage of the present invention is that peak detector timing is optimized for voice communications applications in relatively noisy environments.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed advantages are not essential elements of the present invention, and should not be construed as limitations.

DETAILED DESCRIPTION OF THE INVENTION

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

Figure 1:
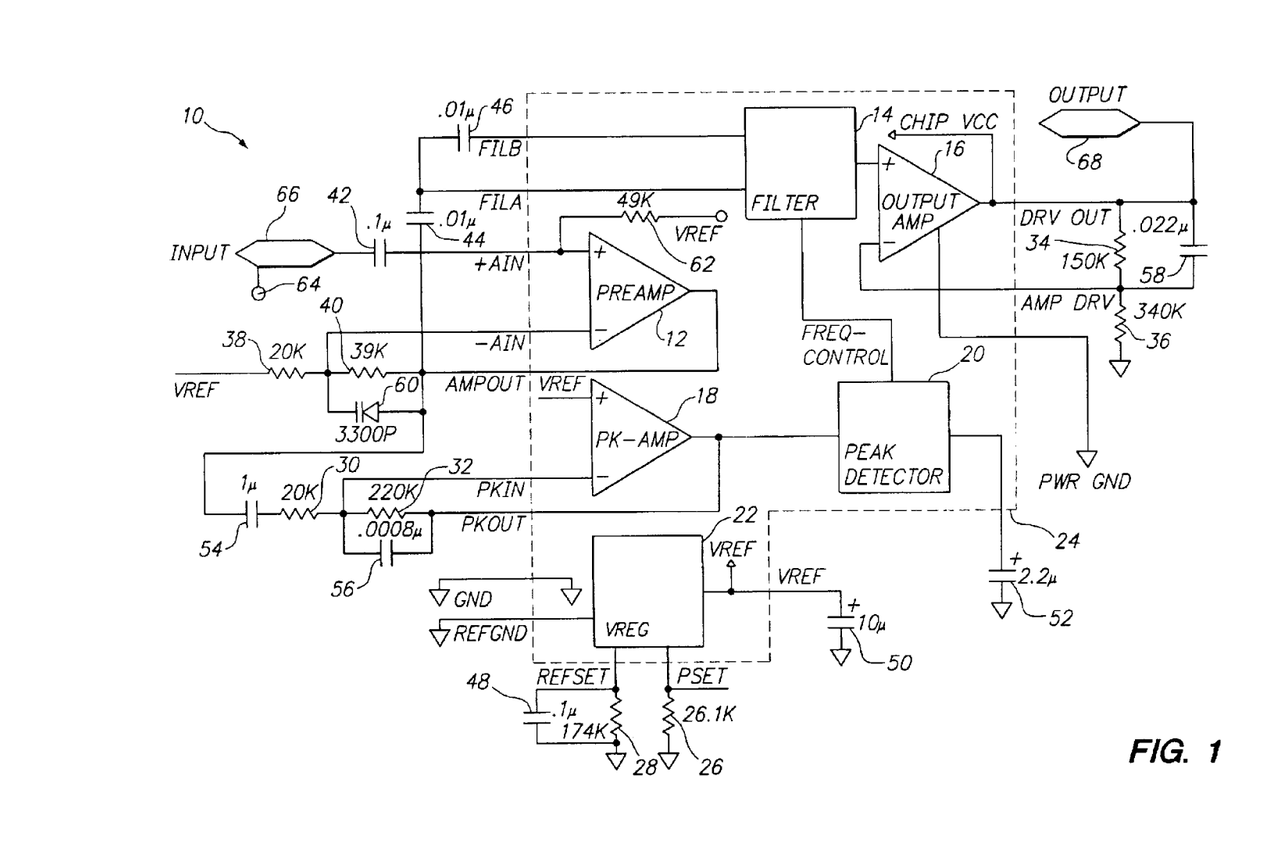
FIG. 1 is a schematic diagram of an example of the present inventive adaptive speech filter.

A known mode for carrying out the invention is an adaptive filter circuit embodied, in this example, primarily in an application specific integrated circuit ("ASIC"). The inventive adaptive filter circuit is depicted in a block schematic diagrammatic view in FIG. 1 and is designated therein by the general reference character 10. As can be seen in the view of FIG. 1, the adaptive filter circuit 10 has a preamp circuit 12, a highpass adaptive filter circuit 14, an output buffer circuit 16, a peak detector amplifier/filter circuit 18 (peak amplifier), a peak detector circuit 20 and a voltage regulator circuit 22 are provided. In the presently described embodiment of the invention, the highpass adaptive filter circuit 14, the output buffer circuit 16, the peak detector amplifier/filter circuit 18, the peak detector circuit 20 and the voltage regulator circuit 22 are embodied in an ASIC 24. Also depicted in the view of FIG. 1 are external resistors 26, 28, 30, 32, 34, 36, 38, and 40, and external capacitors 42, 44, 46, 50, 52, 54, 56 58 and 60, all of which are provided for biasing, isolation and smoothing as depicted in the schematic of FIG. 1 and as will be discussed in further detail hereinafter. VREF voltage is provided to the preamp circuit 12 through an internal resistor 62, as shown in the view of FIG. 1. Audio signal from a microphone 64 is applied to an input port 66 of the ASIC 24.

Components external to the ASIC 24 have values as indicated in the view of FIG. 1. Within the ASIC, one skilled in the art will recognize that component "values" are a function of iterations of the elemental building blocks of the integrated circuit. In the views of FIGS. 1 through 7, where a semiconductor has one, two or three collectors or emitters, these are shown in the drawing. Where such a device has more than three collectors or emitters, a small number in a circle indicates the quantity of such. Similarly, where more than one resistor element is used, the quantity of such is indicated by a small number in a circle beside the component in the views of FIGS. 1 through 7. Such notation will be familiar to one skilled in the art of integrated circuit design.

Figure 2:
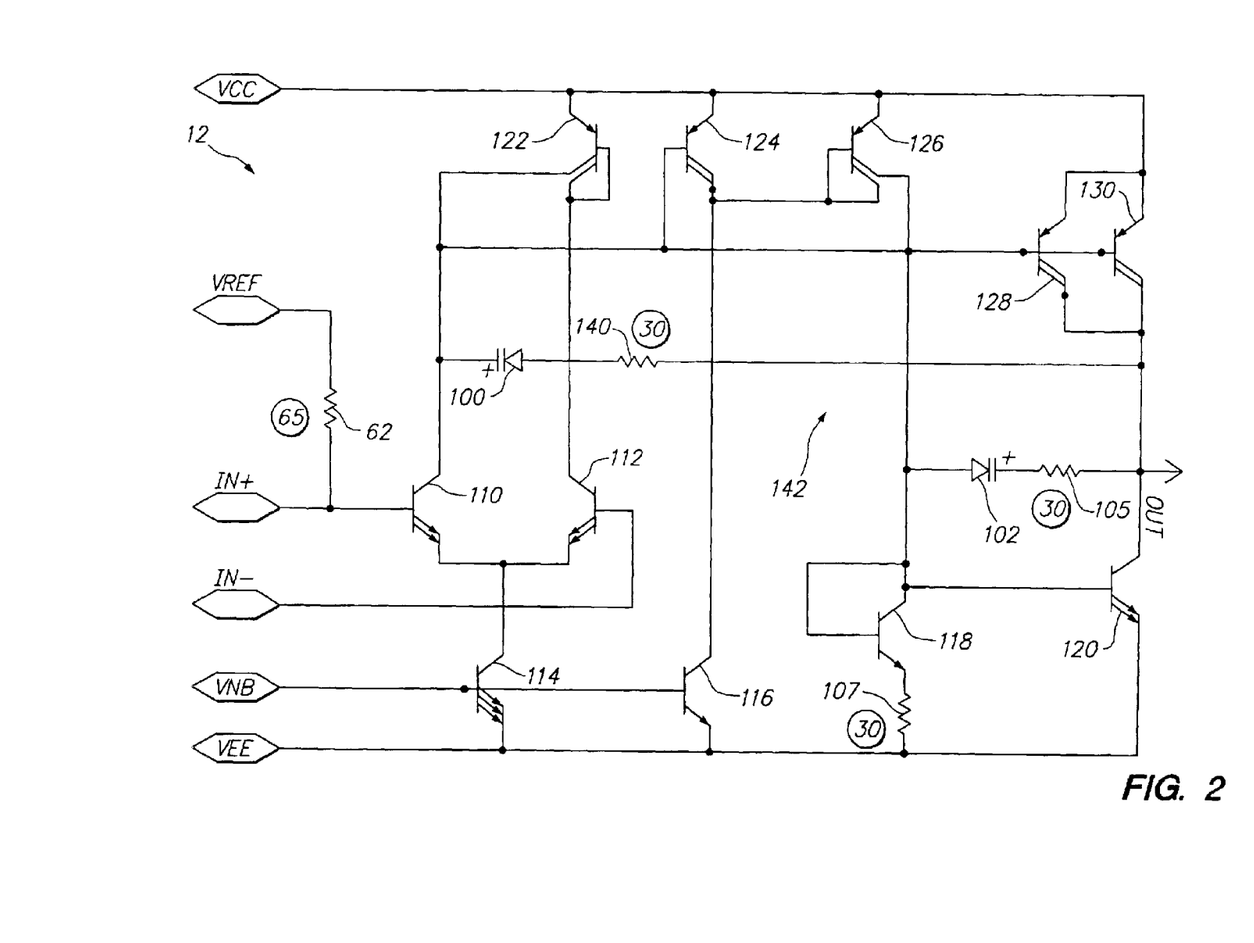
FIG. 2 is a schematic diagram of an example of the input preamp circuit of FIG. 1.

FIG. 2 is schematic diagram of the preamp circuit 12 of FIG. 1. The preamp circuit 12 is a low noise operational amplifier which, in the embodiment described is a non inverting stage, although it should be noted that it is equally possible to configure the preamp circuit 12 as an inverting amplifier should it be necessary or desirable to do so. Capacitors 100, 102 and 104 and resistors 105, 106 and 107 will be discussed in more detail hereinafter. Semiconductors 110, 112, 114, 116, 118, 120, 122, 124, 126, 128, and 130 are connected and biased as shown in the view of FIG. 2.

One skilled in the art will recognize in the view of FIG. 2 that the semiconductors 110 and 112 are a differential pair input first stage, and the semiconductor 122 is a current mirror. A second stage 142 provides a push pull output wherein the semiconductor 12- provides the pull and semiconductors 128 and 130 the push output. Capacitor 102 and resistor 105 provide a frequency compensating network to prevent self oscillation of the circuit, as do the capacitor 100 and resistor 140. Semiconductors 122, 124 and 188 provide level shift and signal inversion. The amplifier type of the second stage 142 is sometimes referred to as an unbufferred transconductance amplifier.

Figure 3:
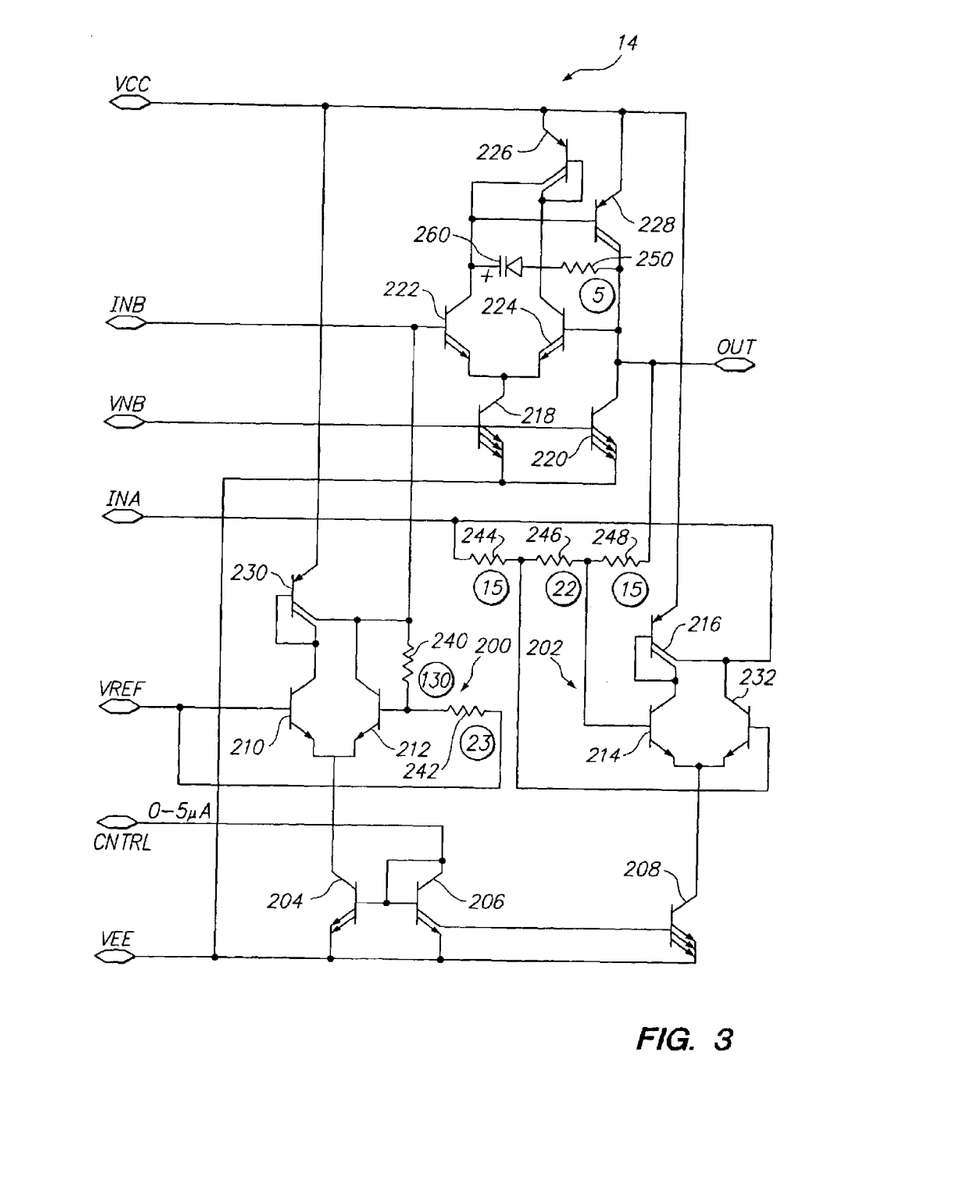
FIG. 3 is a schematic diagram of an example of the highpass adaptive filter circuit of FIG. 1.

FIG. 3 is a schematic diagram of the high pass adaptive filter circuit 14 of FIG. 1. The high pass adaptive filter circuit 14 provides the filtering function central to the performance of the ASIC 24. In the embodiment described, the high pass adaptive filter circuit 14 provides a Chebyshev high pass filter response with a 12 db/octave base roll off. An intent and purpose of the high pass adaptive filter circuit 14 is to suppress ambient low frequency noise associated with wind, automobile road noise, and other sources of 1/f noise. The high pass corner frequency is typically set to 200 Hz under low noise conditions and to a maximum frequency of 1.1 KHz under high noise conditions. The filter corner frequency is set by two current controlled variable resistors 200 and 202. Also visible in the view of FIG. 3 are semiconductors 206, 208, 210, 212, 214, 216, 218, 220, 222, 224, 226, 288, 230 and 232 and resistors 240, 242, 244, 226, 248 and 250 capacitor 260. The variable resistor 200 includes the semiconductors 210, 212 and 230, and the variable resistor 202 includes the semiconductors 214, 216 and 232. These are sometimes referred to a differential pair transconductance cells. A nominal zero to 5 micro amp control current is provided to the variable resistors 200 and 202 through semiconductors 204, 206 and 208, which should track for reliable operation. The semiconductors 222, 224, 226 and 228 and associated components provide an op amp output from the highpass adaptive filter circuit 14. Note that the external capacitors 42 and 44 (FIG. 1) set the initial corner frequency of the highpass adaptive filter circuit 14. The resistors 240 and 242 limit the differential input to semiconductors 210 and 212 in order to avoid distortion.

Figure 4:
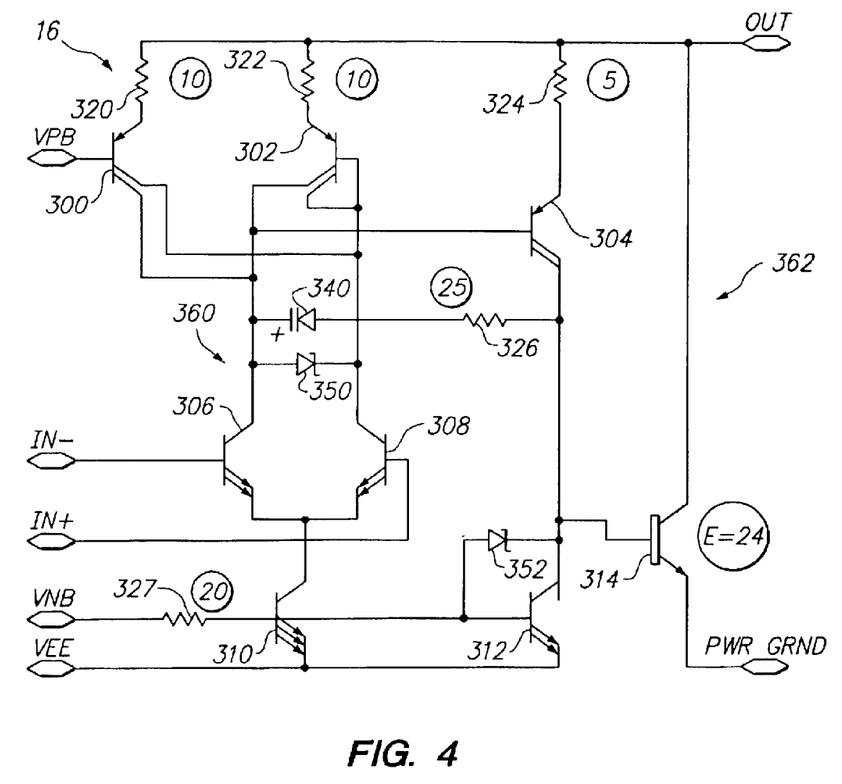
FIG. 4 is a schematic diagram of an example of the output buffer circuit of FIG. 1.

FIG. 4 is a schematic diagram of the output buffer circuit 16 of FIG. 1. The output buffer circuit 16 provides a low output impedance, high signal drive output. In addition it clamps the average DC voltage to 1.2V with bandgap stability. The clamped DC voltage provides power to the other modules in the ASIC 24. The AC output signal is added to the DC voltage at the output port 68 (FIG. 1), and ultimately sensed by the cell phone, radio, or the like to which it is attached. Visible in the view of FIG. 4 are semiconductors 300, 312, 314 and 316, resistors 320, 322, 324, 326, and 327 capacitor 340 and diodes 350 and 352.

Diodes 350 and 352 avoid a startup problem by preventing saturation. The diodes 350 and 352 clamp only when power is first applied to the circuit. Semiconductors 306 and 308 and associated circuitry form a first stage 360 and semiconductor 302 is a current mirror. Semiconductors 312 and 324 and associated circuitry form a second stage 362. The capacitor 340 and resistor 326 are for high frequency compensation as discussed previously in relation to FIG. 2.

Figure 5:
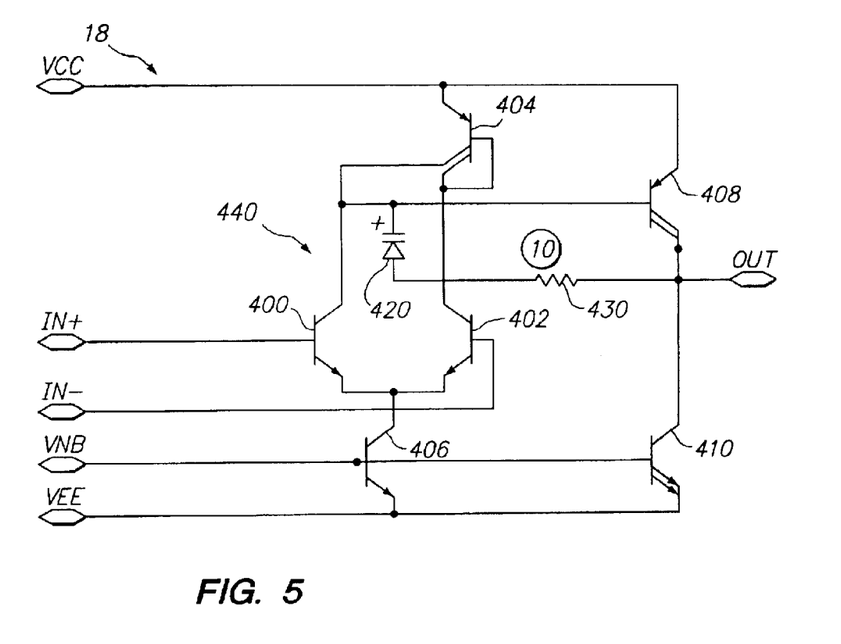
FIG. 5 is a schematic diagram of an example of the peak detector amplifier/filter circuit of FIG. 1.

FIG. 5 is a schematic diagram of the peak detector amplifier/filter circuit 18 of FIG. 1. The peak detector amplifier/filter circuit 18 is used to further condition the audio signal before it is sampled by the peak detector circuit 20 (FIG. 1). Visible in the view of FIG. 5 are semiconductors 400, 402, 404, 406, 408 and 410, capacitor 420 and resistor 430. The semiconductors 402 and 400 and associated circuitry form a first stage and the semiconductor 404 is a current mirror. Semiconductors 408 and 410 provide a buffered output with a fixed bias. The capacitor 420 and resistor 430 provide high frequency compensation.

The gain and frequency response of this stage, in combination with the microphone 64 and preamp circuit 12 response, will have a strong effect on the threshold and aggressiveness of the adaptive speech filter 10. High gain will cause activation of the highpass adaptive filter circuit 14 at low input levels and increase the rate at which the corner frequency is increased versus input level. Strongly emphasizing the low frequency gain will provide a system response sensitive to low frequency noise and less sensitive to the human voice.

Figure 6:
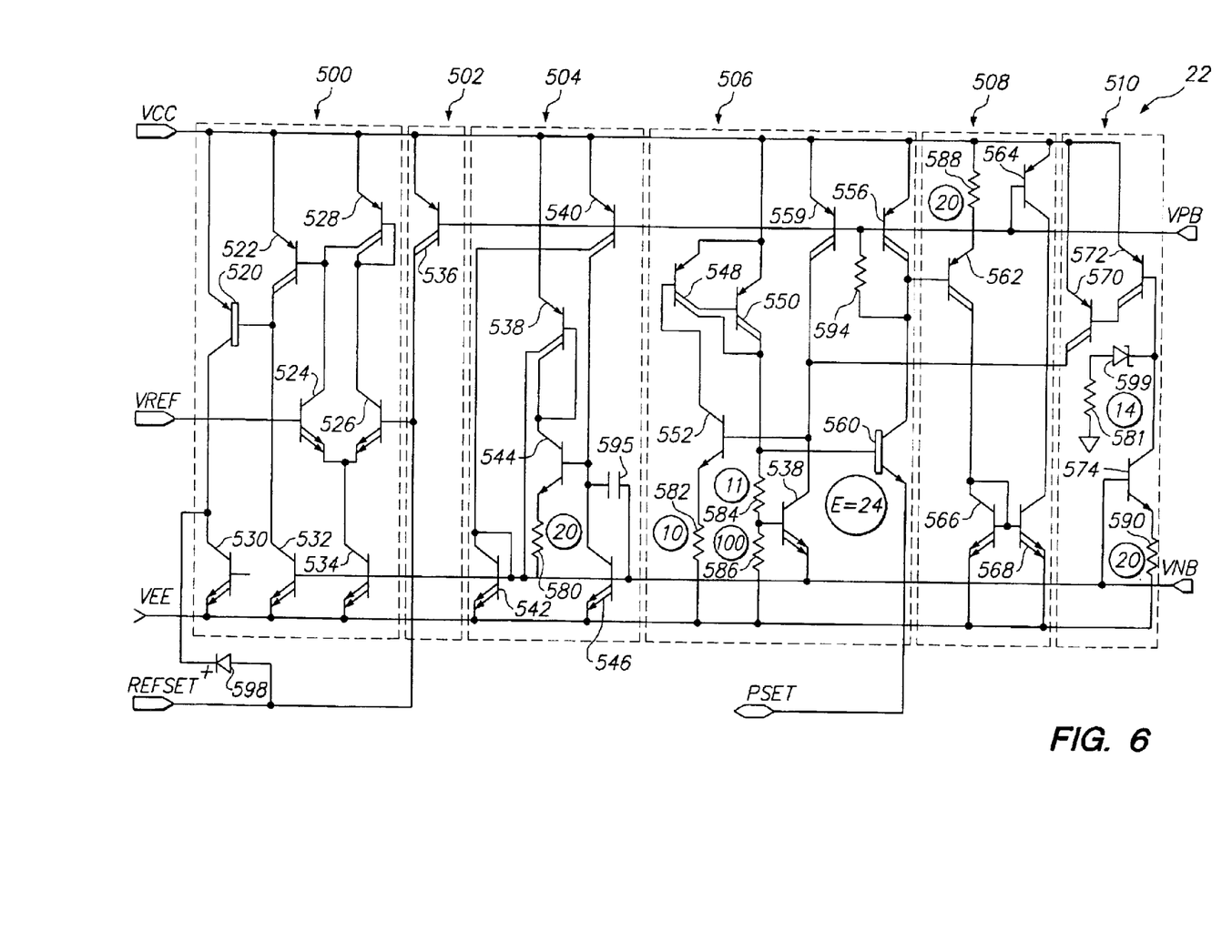
FIG. 6 is a schematic diagram of an example of the voltage regulator circuit of FIG. 1.

FIG. 6 is a schematic diagram of the voltage regulator circuit 22 of FIG. 1. The voltage regulator circuit 22 provides all the reference and bias voltages to the ASIC 24. The primary design goals associated with the voltage regulator circuit 22 are stability, low noise and the ability to smoothly startup and operate at low voltage. The voltage regulator circuit 22 circuit has a reference buffer 500, a reference generator 502, VN generator 504, a bandgap current source 506, a VP generator 508 and a startup circuit 510. Visible in the view of FIG. 6 are semiconductors 520, 522, 524, 526, 528, 530, 532, 534 536, 548, 540, 542, 544, 546, 548, 550, 553, 554, 556, 558, 560, 562, 564, 566, 568, 570, 572 and 574. Also visible are resistors 580, 581, 582, 582, 584, 586, 588, 590, capacitors 594 and 595 and diodes 598 and 599. The semiconductors 520, 522, 524 and 528 form a reference buffer amplifier. The reference generator 502 has the single semiconductor 536. The VN generator 504 and VP generator 508 generate the negative and positive voltages, respectively, for the system. The bandgap current source 506 is a temperature compensated current source. The band gap current source 506 will run at voltages as low as 0.9 volts, and will typically run in this system at VCC (1.2 volts) with a signal (nominally 300 mv peak to peak) riding thereon. The startup circuit 520 is typical and is required for use with all circuits such as the bandgap reference circuit 506. The Shotkey diode 599 prevents saturation of the semiconductor 572.

Figure 7:
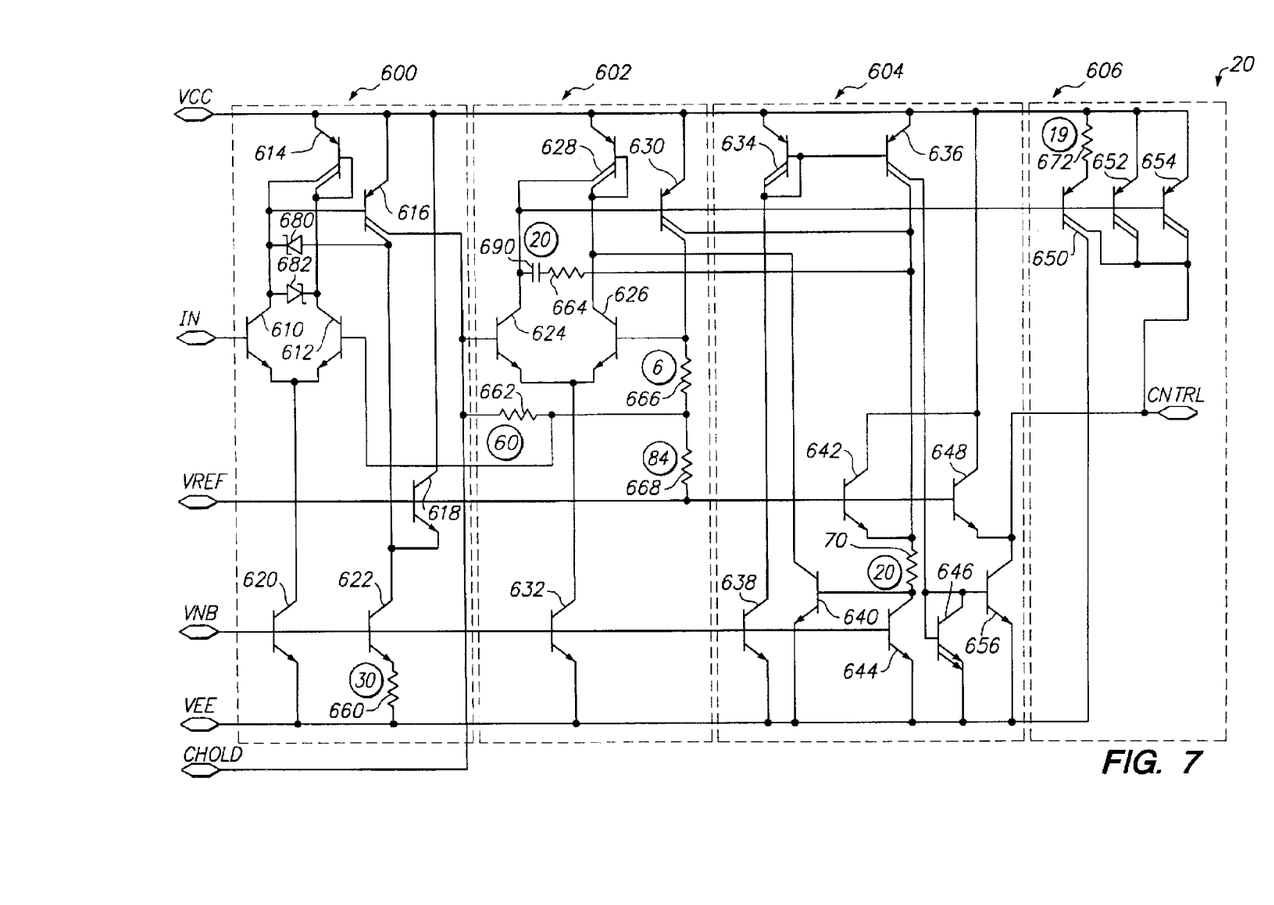
FIG. 7 is a schematic diagram of an example of the peak detector circuit of FIG. 1.

FIG. 7 is a schematic diagram of the peak detector circuit 20 of FIG. 1. The peak detector circuit 20 is a precision rectifier circuit used to detect the peak audio signal supplied by the peak detector amplifier/filter circuit 18 (FIG. 1). The AC signal input is rectified and applied to the external hold capacitor [C7. The attack time is about 70 ms per microfarad of capacitance. The hold time is set at five times longer than the attack time. A voltage controlled current source follows the hold capacitor and drives the highpass adaptive filter circuit 14. The current source has a threshold of 10 mv. In effect, the peak AC signal must exceed the internal reference by 10 mv before the adaptive filter corner frequency is increased. When the peak AC signal reaches 100 mv above the internal reference, the filter corner frequency is set to the maximum value and will not increase further.

The peak detector circuit 20 will respond to constant base noise with greater sensitivity than base tones occurring at the frame rate of human speech. The object is to disregard the human voice in a low noise environment, for example, speech levels in the range of 70 to 75 db SPL, but to fully engage the adaptive filter when constant low frequency noise reaches about 90 to 95 db SPL. It should be noted that wind noise will reach very high effective SPL levels at low frequencies. The peak detector circuit 20 can respond to single wind gusts (under 100 ms) and effectively suppress them.

The peak detector circuit 20 has a peak rectifier section 600, a buffer section 602, a threshold and clamp section 604 and an output section 606. Visible in the view of FIG. 7 are semiconductors 610, 612, 614, 616, 618, 620, 622, 624, 626, 628, 630, 632, 634, 636, 638, 640, 642, 644, 646, 648, 650, 652, 654 and 656. Also visible are resistors 660, 662, 664, 666, 668, 670 and 672, diodes 680, 682 and capacitor 690.

Semiconductors 610, 612 and 614, and diodes 680 and 682 form a precision rectifier circuit. Resistor 660 sets the attack time. In the buffer 602, semiconductors 624, 626 and 628 are a first amplifier stage. Capacitor 690 and resistor 664 provide high frequency compensation. Semiconductor 630 and related circuitry form the second stage of the buffer 602. The threshold and clamp section 604 controls the threshold and upper maximum current for the output of the peal detector circuit 20. In the output section 606 the three semiconductors 650, 652 and 654 are paralleled to provide a nominal zero to five micro amp control output.

Various modifications may be made to the invention without altering its value or scope. For example, the adaptive speech filter 10 could be constructed of discreet components. Alternatively, many of the components described as being external to the ASIC 24, in the presently described example of the invention, could be built into the ASIC 24 in certain specific applications. Also, one skilled in the art will be aware that much of the circuitry described in relation to the specific embodiment of the invention discussed herein could be modified or have substituted therefore equivalent known circuitry elements.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted to cover the entire scope of the invention.

INDUSTRIAL APPLICABILITY

The inventive adaptive speech filter 10 is intended to be widely used in applications including, but not limited to, the processing of speech signals from a microphone to a telephone, radio, or the like, particularly in relatively noisy environments. An example would be the use of the adaptive speech filter 10 with a cellular telephone in an automobile, where wind and road noise would tend to introduce such noise.

The performance of the adaptive speech filter 10 is optimized around the principle of maximizing the intelligibility of speech in the presence of common sources of low frequency noise. In addition, in a quiet environment the system should provide good broad band frequency response.

The deleterious effect of wind noise on microphones, particularly directional microphones, is well known. Wind noise is predominately low frequency noise. A substantial proportion of the road noise experienced in automobiles is also low frequency (under 1 KHz).

It is true that a significant proportion of the acoustic power from the human voice is under 1 kHz. However, there is a known psycho-acoustic phenomenon which tells us that people can obtain very high speech recognition scores even though a brick wall filter rejects all frequencies below about 1.5 KHz. The human voice may sound "thin" but it remains quite understandable. This is the principle upon which the adaptive speech filter 24 is based.

In addition, the very low power required by the ASIC allows the invention to provide both the microphone function and adaptive filtering with the same power normally required for a microphone alone.

Since the adaptive speech filter 10 of the present invention may be readily produced and integrated with existing microphones and communication appliances and devices, and since the advantages as described herein are provided, it is expected that it will be readily accepted in the industry. For these and other reasons, it is expected that the utility and industrial applicability of the invention will be both significant in scope and long-lasting in duration.

What is claimed is:

1. A speech conditioning circuit for conditioning an input signal, comprising:
   a direct current supply terminal;
   a variable filter circuit for filtering said input signal to produce a conditioned signal, said variable filter circuit coupled to receive power via said direct current supply terminal and being controlled by an amplitude detector circuit; and
   an output circuit receiving said conditioned signal from said variable filter circuit and providing an output signal to an output terminal coupled to said direct current supply terminal, said output circuit coupled to receive power via said direct current supply terminal.

2. The speech conditioning circuit of claim 1, wherein:
   said amplitude detector circuit is a peak detector.

3. The speech conditioning circuit of claim 1, and further including:
   a preamplifier circuit for amplifying an input to said variable filter circuit.

4. The speech conditioning circuit of claim 1, wherein:
   said variable filter circuit is a high pass filter; and
   the corner frequency of said variable filter circuit is controlled by said amplitude detector circuit.

5. The speech conditioning circuit of claim 1, wherein:
   input to said amplitude detector circuit is filtered by a filter circuit.

6. The speech conditioning circuit of claim 5, wherein:
   said filter circuit disproportionately passes low frequency signals received via an audio signal input terminal.

7. A telephone input apparatus, comprising:
   a microphone preamplifier for receiving an audio signal via an input;
   a filter for removing low frequency signal content from said audio signal;
   a peak detector for controlling said filter;
   a peak detector amplifier for amplifying input to said peak detector; and
   a telephone input apparatus output terminal for providing signal output from the telephone input apparatus and also for providing direct current power input to the telephone input apparatus; wherein
   a signal from the microphone preamplifier is provided to an input of the filter and said signal is also provided to an input of the peak detector amplifier, and further wherein
   a filtered signal is provided from the filter to the telephone input apparatus output terminal.

8. The telephone input apparatus of claim 7, wherein:
   said peak detector amplifier disproportionately passes a low frequency signal content of said signal received from said microphone preamplifier.

9. The telephone input apparatus of claim 7, wherein:
   said microphone preamplifier is gain adjustable.

10. The telephone input apparatus of claim 7, wherein:
    said peak detector controls the corner frequency of said filter.

11. The speech conditioning circuit of claim 1, wherein:
    said input signal is provided to an input of said variable filter circuit; and
    said input signal is also provided to an input of said amplitude detector circuit.

12. The speech conditioning circuit of claim 11, and further including:
    a preamplifier circuit with an output connected to said input of said variable filter circuit and further connected to said input of said amplitude detector circuit.

* * * * *